US012670620B2

(12) United States Patent
Altillawi et al.

(10) Patent No.: US 12,670,620 B2
(45) Date of Patent: Jun. 30, 2026

(54) DATA PROCESSING APPARATUS AND METHOD FOR DETERMINING A POSE

(71) Applicant: HUAWEI TECHNOLOGIES CO., LTD., Shenzhen (CN)

(72) Inventors: Mohammad Altillawi, Munich (DE); Ibrahim Halfaoui, Munich (DE); Onay Urfalioglu, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 18/523,567

(22) Filed: Nov. 29, 2023

(65) Prior Publication Data

US 2024/0104773 A1 Mar. 28, 2024

Related U.S. Application Data

(63) Continuation of application No. PCT/EP2021/074880, filed on Sep. 10, 2021.

(51) Int. Cl.
*G06T 7/73* (2017.01)

(52) U.S. Cl.
CPC ...... *G06T 7/74* (2017.01); *G06T 2207/20076* (2013.01); *G06T 2207/20081* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 11,062,475 B2 * | 7/2021 | Nakashima | .......... | G06N 3/0455 |
| 2019/0303725 A1 * | 10/2019 | Gurvich | ............... | G06F 18/217 |
| 2021/0342990 A1 * | 11/2021 | Huang | ...................... | G06T 7/80 |
| 2022/0414974 A1 * | 12/2022 | Zakharov | ................. | G06T 7/50 |
| 2024/0161337 A1 * | 5/2024 | Schönberger | ......... | G06F 16/535 |

OTHER PUBLICATIONS

Altillawi, M., Li, S., Prakhya, S. M., Liu, Z., & Serrat, J. (2023). Implicit learning of scene geometry from poses for global localization. IEEE Robotics and Automation Letters, 9(2), 955-962. (Year: 2023).*

(Continued)

*Primary Examiner* — Ian L Lemieux

(74) *Attorney, Agent, or Firm* — Leydig, Voit & Mayer, Ltd.

(57) ABSTRACT

A data processing apparatus for determining a pose of an image capturing device based on an image of a three dimensional (3D) scene is disclosed. The data processing apparatus comprises a processing circuitry configured to: select a plurality of key two dimensional (2D) points of a plurality of 2D points of the image based on a respective score of each of the plurality of 2D points; determine at least for a subset of the plurality of 2D points of the image a respective feature vector for obtaining a plurality of feature vectors; concatenate the image with the plurality of feature vectors for obtaining an intermediate tensor; determine a plurality of 3D points of the 3D scene based on the intermediate tensor; and determine the pose based on the plurality of key 2D points of the image and the plurality of 3D points of the 3D scene using a Perspective-n-Point scheme.

16 Claims, 8 Drawing Sheets

800

Selecting a plurality of key 2D points of a plurality of 2D points of the image based on a respective score of the respective 2D point — 801

Determining at least for a subset of the plurality of 2D points of the image a respective feature vector for obtaining a plurality of feature vectors — 803

Concatenating the image with the plurality of feature vectors for obtaining an intermediate tensor — 805

Determining a plurality of 3D points of the 3D scene based on the intermediate tensor — 807

Determining the pose based on the plurality of key 2D points of the image and the plurality of 3D points of the 3D scene using a Perspective-n-Point scheme — 809

(56) References Cited

OTHER PUBLICATIONS

Moreau, A., Piasco, N., Tsishkou, D., Stanciulescu, B., & de La Fortelle, A. (2022). Coordinet: uncertainty-aware pose regressor for reliable vehicle localization. In Proceedings of the IEEE/CVF Winter Conference on Applications of Computer Vision (pp. 2229-2238 ). (Year: 2022).*

Doan, A. D., Turmukhambetov, D., Latif, Y., Chin, T. J., & Bae, S. (May 2021). Learning to predict repeatability of interest points. In 2021 IEEE International Conference on Robotics and Automation (ICRA) (pp. 10294-10301). IEEE. (Year: 2021).*

Tang, S., Tang, C., Huang, R., Zhu, S., & Tan, P. (2021). Learning camera localization via dense scene matching. In Proceedings of the IEEE/CVF Conference on Computer Vision and Pattern Recognition (pp. 1831-1841). (Year: 2021).*

Sattler, T., Leibe, B., & Kobbelt, L. (Oct. 2012). Improving image-based localization by active correspondence search. In European conference on computer vision (pp. 752-765). Berlin, Heidelberg: Springer Berlin Heidelberg. (Year: 2012).*

Piasco et al., "Perspective-n-Learned-Point: Pose Estimation from Relative Depth," British Machine Vision Conference, HAL open science, XP055922038, Total 16 pages (Jul. 23, 2019).

Sattler et al., "Efficient & Effective Prioritized Matching for Large-Scale Image-Based Localization," IEEE Transactions on Pattern Analysis and Machine Intelligence, vol. 39, No. 9, Total 14 pages (Sep. 2017).

Kendall et al., "Geometric loss functions for camera pose regression with deep learning," 2017 IEEE Conference on Computer Vision and Pattern Recognition (CVPR), arXiv:1704.00390v2, Total 10 pages (May 2017).

Walch et al., "Image-based localization using LSTMs for structured feature correlation," 2017 IEEE International Conference on Computer Vision (ICCV) Total 11 pages (Aug. 2017).

Brahmbhatt et al., "Geometry-Aware Learning of Maps for Camera Localization," 2018 IEEE/CVF Conference on Computer Vision and Pattern Recognition, Total 10 pages (Date of Conference: Jun. 2018).

Wang et al., "AtLoc: Attention Guided Camera Localization," Proceedings of the AAAI Conference on Artificial Intelligence, arXiv:1909.03557V2, Total 9 pages (Oct. 2019).

Ott et al., "ViPR: Visual-Odometry-aided Pose Regression for 6DoF Camera Localization," 2020 IEEE/CVF Conference on Computer Vision and Pattern Recognition Workshops (CVPRW), 2020 IEEE DOI 10.1109/CVPRW50498.2020.00029, Total 12 pages (Jun. 2020).

* cited by examiner

800

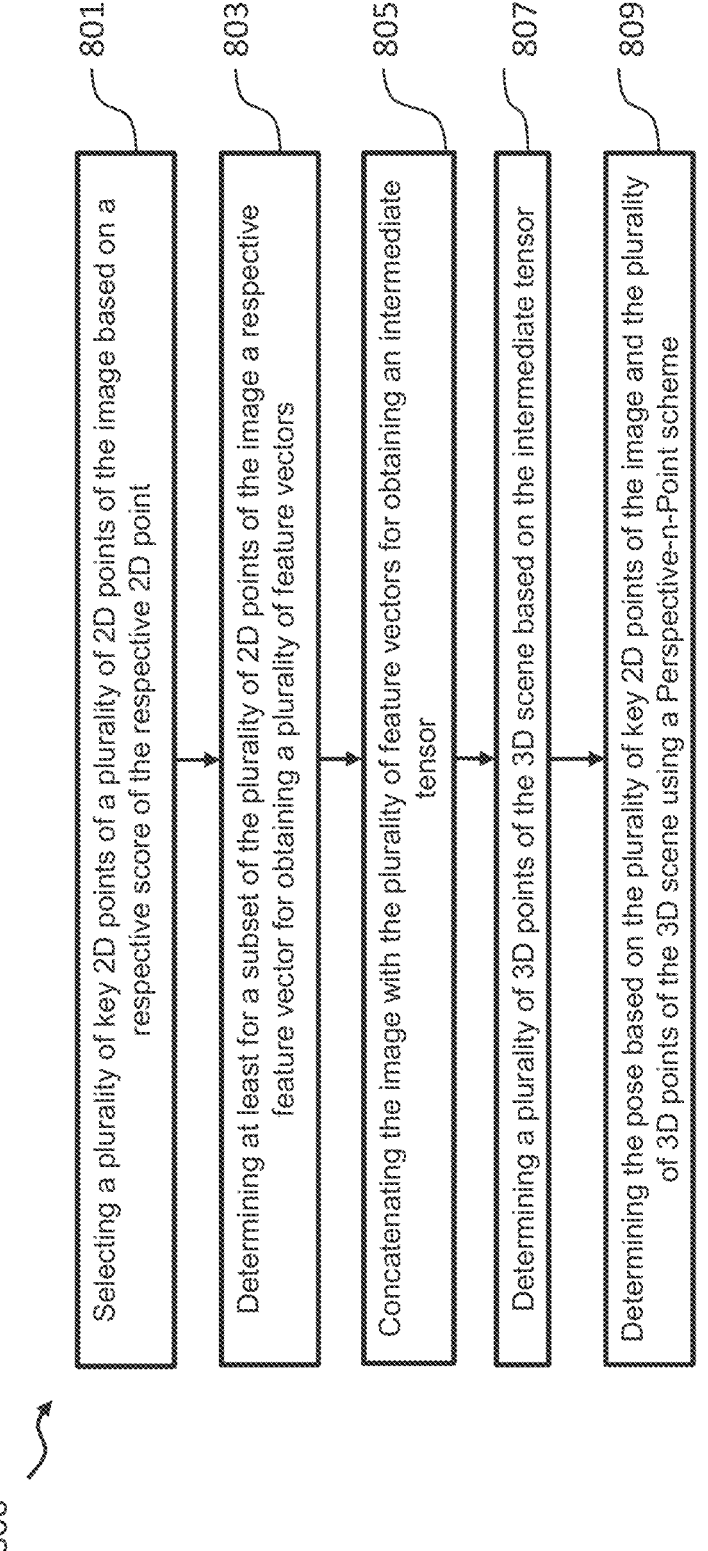

801

Selecting a plurality of key 2D points of a plurality of 2D points of the image based on a respective score of the respective 2D point

803

Determining at least for a subset of the plurality of 2D points of the image a respective feature vector for obtaining a plurality of feature vectors

805

Concatenating the image with the plurality of feature vectors for obtaining an intermediate tensor

807

Determining a plurality of 3D points of the 3D scene based on the intermediate tensor

809

Determining the pose based on the plurality of key 2D points of the image and the plurality of 3D points of the 3D scene using a Perspective-n-Point scheme

Fig. 8

DATA PROCESSING APPARATUS AND METHOD FOR DETERMINING A POSE

CROSS-REFERENCE TO RELATED APPLICATIONS

This application is a continuation of International Application No. PCT/EP2021/074880, filed on Sep. 10, 2021, the disclosure of which is hereby incorporated by reference in its entirety.

TECHNICAL FIELD

The present disclosure relates to a data processing apparatus and method for determining a pose of an image capturing device based on an input image.

BACKGROUND

Accurate visual localization is a fundamental capability for numerous applications, such as autonomous driving, mobile robotics, or augmented reality. This growing range of applications of visual localization calls for reliable localization both indoors and outdoors. Classical structure based methods as well as recent deep learning methods have worked on solving visual localization.

Structure based methods first extract features from a query image, describe these features, and then match these features to a given three dimensional (3D) model. The resulting correspondences are often passed to a Perspective-n-Point (PnP) solver within a random sample consensus (RANSAC) scheme to estimate a pose. Structure based methods rely on a 3D model which has a high memory print. A descriptor matching step to obtain correspondences is an expensive and time consuming procedure. In addition, the obtained correspondences can be noisy and the number of outliers increases with the size of the model resulting in an increase of the runtime of the RANSAC scheme.

On the other side, deep learning direct approaches regress the pose directly from a given image or a sequence of images. They usually finetune a large classification deep neural network, which is pretrained on a large image dataset, on the pose regression task. Compared to structure based methods, they are faster. However, their localization accuracy is lower than structure based methods.

Therefore, there arises a need to address the aforementioned technical drawbacks in existing systems or technologies for accurate visual localization.

SUMMARY

In view of the above, the present application provides an apparatus for determining a pose that enables to provide accurate visual localization in a robust manner, making use of an image capturing device.

Generally, a data processing apparatus and method for determining a pose of an image capturing device, such as a camera, based on an input image is provided. Implementations disclosed herein allow for a camera localization from a single image based on deep learning that obtains a much lower localization error than classical structure based methods, runs faster and does not require a storage of a 3D model or a database of images avoiding big memory occupation. Accordingly, a much more accurate localization than deep learning pose regressors as well as run in real-time and store only the weights of the deep learning network.

Moreover, in implementations disclosed herein correspondences may be obtained without matching. For every key point of interest its 3D global point in space may be regressed directly. Hence, the expensive step of descriptors matching may be avoided, which accelerates the run-time. Implementations disclosed herein rely on a minimalistic set of correspondences which allows to limit the number of iterations of the RANSAC scheme and thus its run-time. Furthermore, a more accurate localization compared to classical and deep learning based methods may be obtained.

According to a first aspect, a data processing apparatus for determining a pose based on an image of a 3D scene is provided. E.g., a 3D position and orientation of an image capturing device based on a two dimensional (2D) image of a 3D scene is provided. The data processing apparatus comprises a processing circuitry configured to:

select a plurality of key 2D points (also referred to as pixels) of a plurality of 2D points of the image based on a respective score of the respective 2D point;

determine at least for a subset of the plurality of 2D points of the image a respective feature vector (also referred to as descriptor) for obtaining a plurality of feature vectors;

concatenate the image with the plurality of feature vectors for obtaining an intermediate tensor;

determine a plurality of 3D points of the 3D scene based on the intermediate tensor; and determine the pose based on the plurality of key 2D points of the image and the plurality of 3D points of the 3D scene using a Perspective-n-Point scheme.

By selecting a subset of the plurality of 2D points that are reliable based on the confidence score, the localization can be efficient and more accurate. It is more efficient because localization is performed from low number of 2D-3D correspondences. It is more accurate, because the selected subset includes low number of outliers. Moreover, by using a Perspective-n-Point scheme instead of a conventional pose regression, the pose estimated is more accurate and reliable.

According to an implementation, the processing circuitry is configured to determine the pose based on the plurality of key 2D points of the image and the plurality of 3D points of the 3D scene using the Perspective-n-Point scheme and a random sample consensus, RANSAC, scheme.

Using RANSAC allows filtering outliers to make localization more robust. By providing RANSAC with a low number of correspondences that include a low number of outliers, the number of iterations of RANSAC may be limited which has an exponential runtime with the number of provided correspondences. This makes localization more robust.

According to an implementation, the image comprises one or more image channels.

The advantage of using an image, is that cameras are cheap sensors when compared to other sensors like Lidar.

According to an implementation, the score determined by the processing circuitry for each of the plurality of 2D points is a confidence score. The confidence score may be based on a repeatability score and/or a reliability score. The computation of a confidence score allows weighting each correspondence and filtering out unreliable correspondences.

According to an implementation, the processing circuitry is configured to implement a neural network configured to determine the plurality of 3D points of the 3D scene based on the intermediate tensor. Using the intermediate tensor including the feature vectors, simplifies the training process of the 3D neural network. In this context, the 3D neural network can learn in an easier manner the mapping of the image pixels to the 3D coordinates in addition to producing more accurate estimation of the 3D coordinates which in return help produce a more accurate pose.

According to an implementation, the processing circuitry is configured to implement a further neutral network configured to determine the score for selecting the plurality of key 2D points of the plurality of 2D points of the image based on the respective score of the respective 2D point.

According to an implementation, the further neural network is further configured to determine at least for the subset of the plurality of 2D points of the image the respective feature vector.

According to an implementation, the processing circuitry is configured to train the further neural network using a target heat map based on a training image, wherein a plurality of maximum values of the target heat map correspond to a plurality of locations of the projections of a plurality of 3D points of a sparse 3D model of the 3D scene. This supports generating confidence values for the key points. Thus, it weighs each key point. For reliable key points, it gives them high confidence values. Consequently, less reliable key points are weighted with low scores.

According to an implementation, the processing circuitry is configured to implement a single neural network configured to determine the plurality of 3D points of the 3D scene based on the intermediate tensor and to determine the score for selecting the plurality of key 2D points of the plurality of 2D points of the image based on the respective score of the respective 2D point. This facilitates the sharing of the computation effort and the knowledge between the 2D neural network and the 3D neural network. This architecture, that is having a single neural network, can learn during training from both tasks, the 3D coordinates estimation and the 2D key points confidence prediction, thus it gains more knowledge about the target localization. By sharing some parts between the two architectures, the memory footprint can be shared reducing computation effort and memory requirements.

According to an implementation, the processing circuitry is configured to train the single neural network using a target heat map based on a training image, wherein a plurality of maximum values of the target heat map correspond to a plurality of locations of the projections of a plurality of 3D points of a sparse 3D model of the 3D scene.

According to an implementation, the processing circuitry is configured to concatenate the image with the plurality of feature vectors for obtaining the intermediate tensor by concatenating for each 2D point an intensity value of the 2D point with the feature vector of the 2D point. The feature vector encodes additional information about each pixel. Adding this information to the pixel may help in making the prediction of the 3D scene invariant to certain conditions such as scale, lighting changes and day-night changes. The feature vector can be invariant to these conditions. By the concatenation, the image pixel becomes invariant and thus the mapping from image pixels to 3D coordinates becomes more reliable. For example, with this concatenation, the 3D coordinates can be predicted for a night image even though the neural network has been trained only on day light images.

According to a second aspect a data processing method for determining a pose based on an image of a 3D scene is provided. The pose is a position and an orientation of an image capturing device, for example. The data processing method comprises the steps of:

selecting a plurality of key 2D points (also referred to as pixels) of a plurality of 2D points of the image based on a respective score of the respective 2D point;

determining at least for a subset of the plurality of 2D points of the image a respective feature vector (also referred to as descriptor) for obtaining a plurality of feature vectors;

concatenating the image with the plurality of feature vectors for obtaining an intermediate tensor;

determining a plurality of 3D points of the 3D scene based on the intermediate tensor; and determining the pose based on the plurality of key 2D points of the image and the plurality of 3D points of the 3D scene using a Perspective-n-Point scheme.

The method according to the second aspect can be performed by the data processing apparatus according to the first aspect of the present disclosure. Thus, further features of the method according to the second aspect result directly from the functionality of the data processing apparatus according to the first aspect as well as its different implementations described above and below. Further features and implementations of the method according to the second aspect correspond to the features and implementations of the data processing apparatus according to the first aspect.

According to a third aspect, a computer program product is provided comprising a computer-readable storage medium for storing program code which causes a computer or a processor to perform the method according to the second aspect when the program code is executed by the computer or the processor.

Details of one or more embodiments are set forth in the accompanying drawings and the description below. Other features and advantages are also described according to the description, drawings, and claims.

BRIEF DESCRIPTION OF THE DRAWINGS

In the following, embodiments of the present disclosure are described in more detail with reference to the attached figures and drawings, in which:

FIG. 8 shows a flow diagram illustrating a data processing method for determining a pose.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of exemplary method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if an exemplary apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
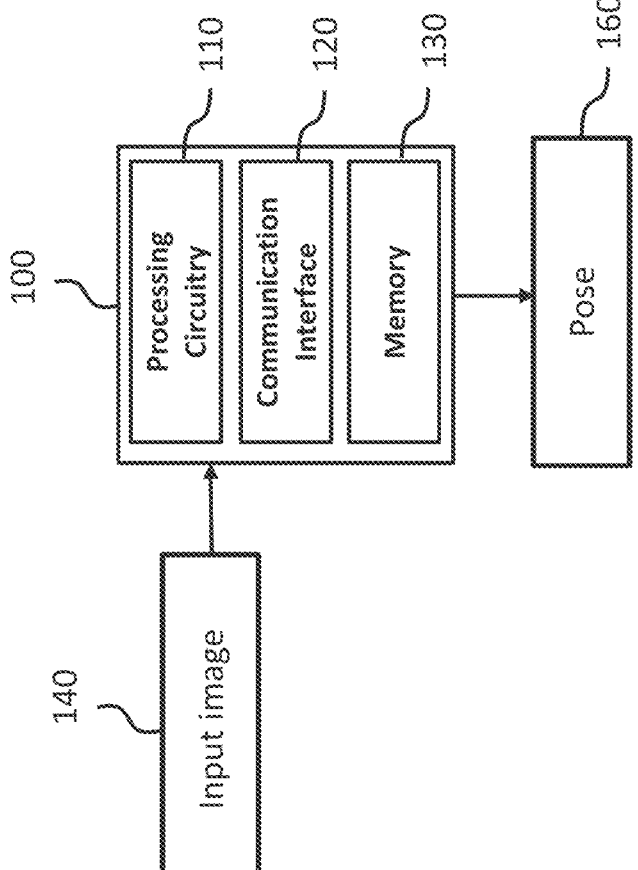
FIG. 1 shows a schematic diagram illustrating a data processing apparatus.

FIG. 1 shows a schematic diagram illustrating a data processing apparatus 100. As will be described in more detail below, the data processing apparatus 100 is configured to determine a pose 160, e.g., a position and an orientation of an image capturing device based on a single 2D image 140 of a 3D scene 150. In an embodiment, the image capturing device may be a camera implemented, for instance, in an autonomous vehicle or an ADAS system of a vehicle.

As illustrated in FIG. 1, the data processing apparatus 100 comprises a processing circuitry 110 for processing data. The processing circuitry 110 may be implemented in hardware and/or software. The hardware may comprise digital circuitry, or both analog and digital circuitry. Digital circuitry may comprise components such as application-specific integrated circuits (ASICs), field-programmable arrays (FPGAs), digital signal processors (DSPs), or one or more general-purpose processors. As illustrated in FIG. 1, the data processing apparatus 100 may further comprise a communication interface 120 for exchanging data and a memory 130. In an embodiment, the memory 130 may be configured to store executable program code which, when executed by the processing circuitry 110, causes the data processing apparatus 100 to perform the functions and operations described herein.

Figure 2:
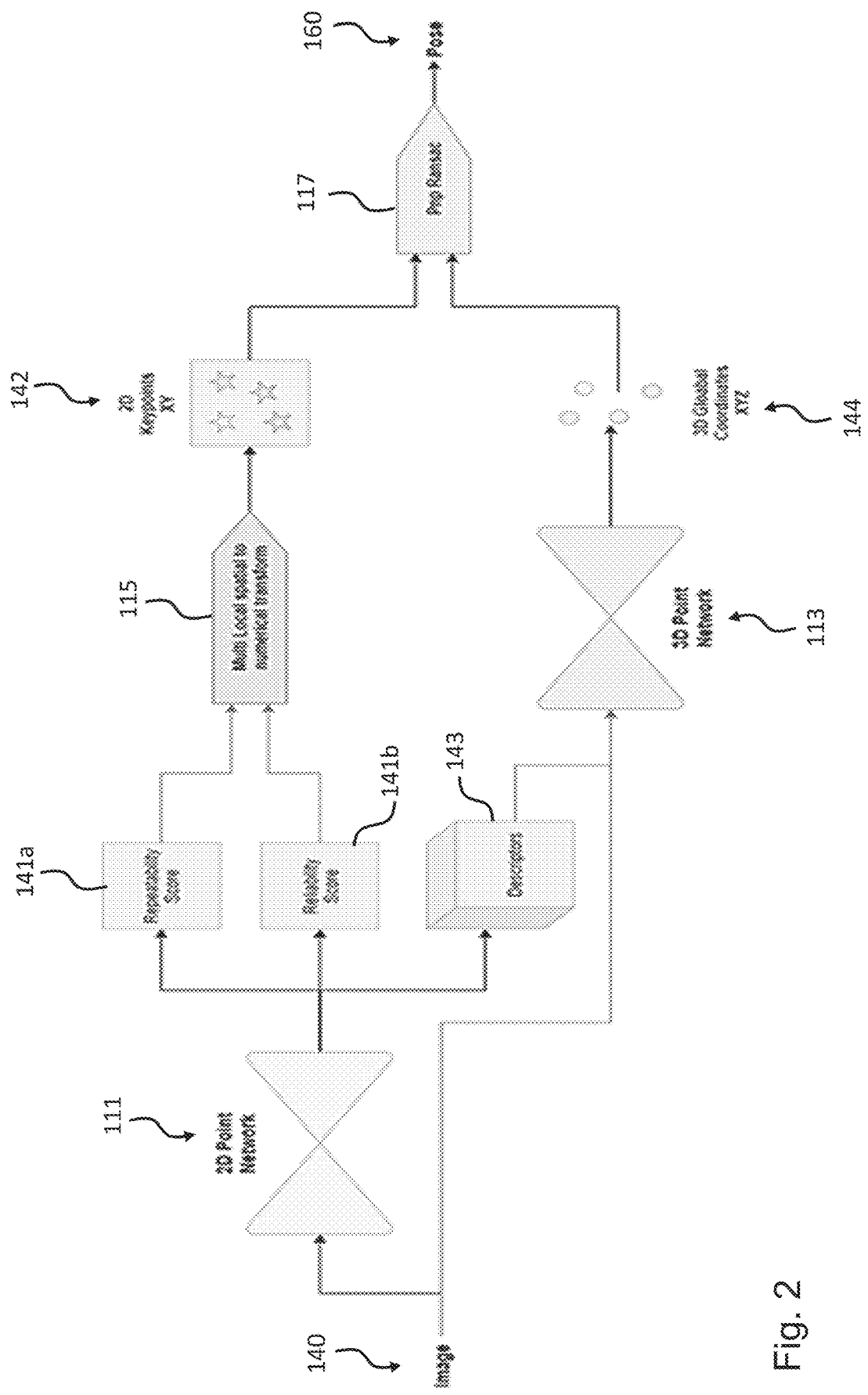
FIG. 2 shows a schematic diagram illustrating a plurality of processing blocks implemented by a data processing apparatus.

FIG. 2 shows several processing blocks that in an embodiment may be implemented by the processing circuitry 110 of the data processing apparatus 100 for determining the pose 160 based on the input image 140. As will be described in more detail below, the processing circuitry 110 of the data processing apparatus 100 is configured to select a plurality of key 2D points 142 of a plurality of 2D points of the image 140 based on a respective score of the respective 2D point. The processing circuitry 110 is further configured to determine at least for a subset of the plurality of 2D points of the image 140 a respective feature vector for obtaining a plurality of feature vectors 143. Moreover, as further illustrated in FIG. 4 in more detail, the processing circuitry 110 is configured to concatenate the image 140 with the plurality of feature vectors 143 for obtaining an intermediate tensor 145. The processing circuitry 110 is further configured to determine a plurality of 3D points 144 of the 3D scene 150 based on the intermediate tensor 145 and determine the pose 160 based on the plurality of key 2D points 142 of the image 140 and the plurality of 3D points 144 of the 3D scene 150 using a Perspective-n-Point scheme.

In the present disclosure, a method implemented by the processing circuitry 110 of the processing apparatus 100 is provided to localize a camera from a single image 140 with high accuracy in real-time and with low memory requirements. The image 140 may provide rich information but may not incorporate depth or 3D information. In addition, large parts of the acquired images 140, e.g., the image 140 may not be reliable for localization due to repetitive non discriminative structure. Thus, a new approach for camera localization that exploits parts of the scene 150 which are discriminative for localization is presented in this disclosure. The information of the 2D image 140 may be extended into 3D information out of which discriminative regions, in particular very discriminative regions, are selected and used exclusively for localization. The chosen discriminative regions are ranked based on a score and only the top correspondences are considered to estimate the pose of the camera.

By exploiting discriminative regions of the environment, e.g., the 3D scene 150, not only reliable correspondences are obtained but also large numbers of outliers, e.g., wrong correspondences are avoided which degrade the localization accuracy and runtime.

According to the present disclosure feature vectors 143 are used, also referred to as dense descriptors 143, together with the image 140 to estimate the absolute 3D coordinates of the environment, e.g., the 3D scene 150 observed by the image 140. In addition, confidence scores, such as repeatability and reliability scores, are utilized to select parts of the environment, e.g., the 3D scene 150 and prioritize these regions out of which only the top ones are selected for pose estimation.

Figure 3:
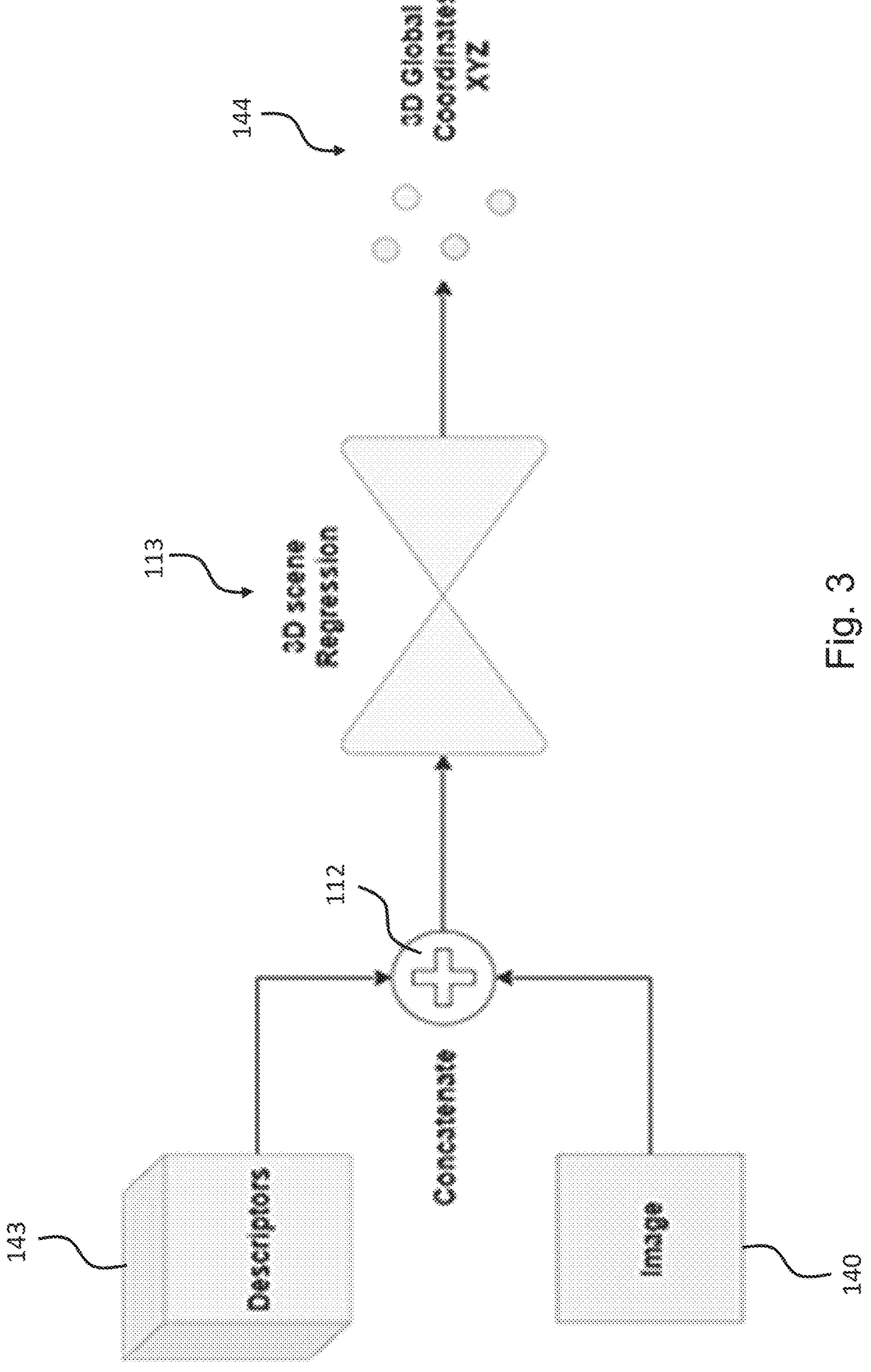
FIG. 3 shows a schematic diagram illustrating in more detail some of the processing blocks of FIG. 2.

As illustrated in FIG. 2, given the image 140, sets of scores 141a-b are estimated by the processing circuitry 110 in addition to a dense descriptor 143, e.g., feature vector 143 for every pixel of the image 140. The dense descriptors 143, e.g., feature vectors 143 and the image 140 are concatenated 112 (as shown in FIG. 3) and used to estimate the 3D scene 150. Given the repeatability and reliability scores 141a-b a single score is obtained, in particular by multiplying both. Since heat maps may be important to detect the location of 2D key points 142, a module for multi local spatial to numerical transform 115 implemented by the processing circuitry 110 may be provided to obtain the pixel coordinates of the 2D key points 142 from these heat maps. In an embodiment, after a refinement step, e.g., ranking the 2D-3D correspondences, the top choices may be passed to a PnP solver 117 within a RANSAC framework which may be implemented by the processing circuitry 110 to estimate the pose 160.

In an embodiment, the processing circuitry 110 may be configured to implement a neural network 113 configured to determine the plurality of 3D points 144 of the 3D scene 150 based on the intermediate tensor 145. In an embodiment the processing circuitry 110 may be configured to implement a further neutral network 111 configured to determine the score for selecting the plurality of key 2D points 142 of the plurality of 2D points of the image 140 based on the respective score of the respective 2D point. In a further embodiment, the neural network 113 and the further neural network 111 may be comprised in a single neural network 111, 113.

Thus, given a single image 140, 2D key points 142 together with their descriptors 143, e.g., feature vectors 143 may be obtained from the neural network 111. The descriptors 143 are concatenated 112 to the input image to form the input for the 3D point Network 113 to regress the scene 150. The pixel locations of the key points of interest are obtained from the heat maps to enable end to end training using the multi local spatial to numerical transform. A minimalistic set of correspondences with high reliability and repeatability scores 141*a-b* are used to compute the pose 160.

In the following, the 3D Scene estimation will be described in more detail. The apparatus 100 utilizes not only the image 140 but also the set of descriptors 143. This is described in more detail in FIG. 3 which shows a schematic diagram illustrating in more detail some of the processing blocks implemented by the processing circuitry 110 shown in FIG. 2.

The image 140 itself may not give enough distinguishable input to regress reliable 3D global coordinates. Each 2D key point 142 may be described by a descriptor 143, e.g., feature vector 143. 2D key points 142 with high repeatability and reliability scores 141*a-b* potentially possess distinguishable descriptors 143. Considering this, dense descriptors 143 are beneficial to the task of 3D scene regression. Channel-wise Concatenation 112 of the input RGB image, e.g., image 140 and the descriptors' tensor, e.g., the intermediate tensor 145 is performed and introduced to the model to learn the 3D scene 150. As shown in FIG. 3, the image 140 together with the descriptors 143, e.g., feature vectors 143 may be concatenated 112 to form the input for the neural network 113 out of which the 3D global coordinates 144 of the scene 150, that is seen by the image 140, is estimated.

Figure 4:
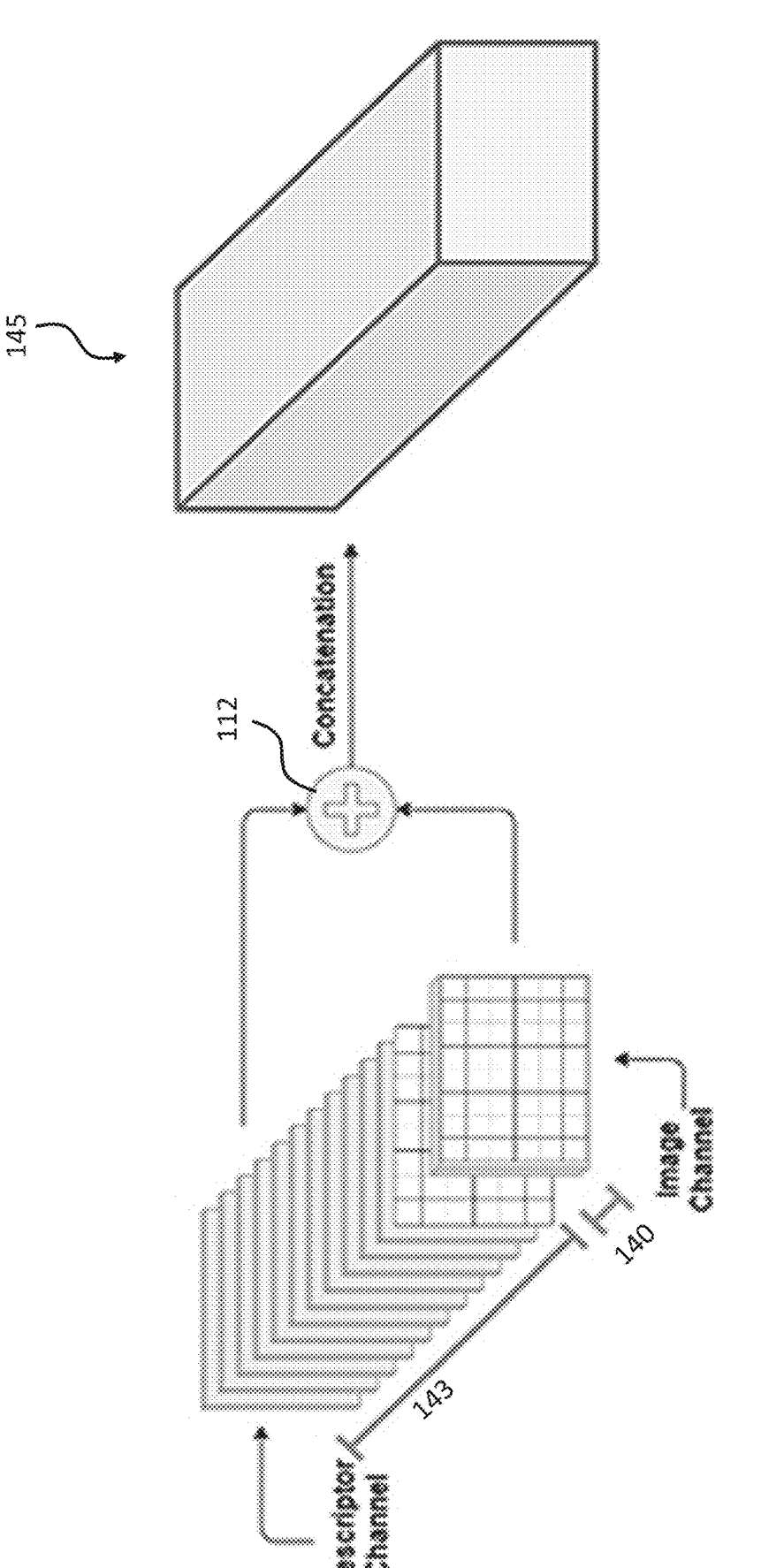
FIG. 4 shows a schematic diagram illustrating in more detail some of the processing blocks of FIG. 3.

FIG. 4 shows a schematic diagram illustrating in more detail some of the processing blocks of FIG. 3 implemented by the processing circuitry 110, in particular the concatenation 112. In an embodiment, the image 140 may comprise one or more image channels. Given an exemplary image 140 of dimension of dimension H×W×3 and an exemplary descriptor 143 of dimension H×W×128, e.g., comprising a descriptor channel 143, a concatenation 112 along the third dimension may result in a unit of information of dimension H×W×131, where H, W, 131 are the height of the image, width of the image, and number of channels respectively. The channels, in particular RGB channels of the image 140 may be concatenated 112 to the 128 channels of the dense descriptors 143 resulting in one unit of 131 channels with the height and width same as the input image 140.

In the following, the selection of scene regions and prioritization of correspondences will be described in more detail. As already described above, the processing circuitry 110 of the processing apparatus 100 may utilize repeatability and reliability scores 141*a-b* for the task of global pose estimation from a single image 140, combines the repeatability and reliability scores 141*a-b* to weigh parts of the scene 150 and distinguishes which information of the scene 150 is relevant for pose localization.

Thus, a respective score for each pixel in the image 140 is obtained, in particular by multiplying the repeatability and reliability scores 141*a-b*. The repeatability may be interpreted by the processing circuitry 110 as a measure to inform about how probable a key 2D point 142 can be seen in other similar perspectives and the reliability may be used as a measure to inform how reliable a key 2D point 142 is to be matched against key 2D points 142 observed in other similar perspectives. The higher the obtained score, the better the chance for a key 2D point 142 to be discriminative and to be matched.

Figure 5:
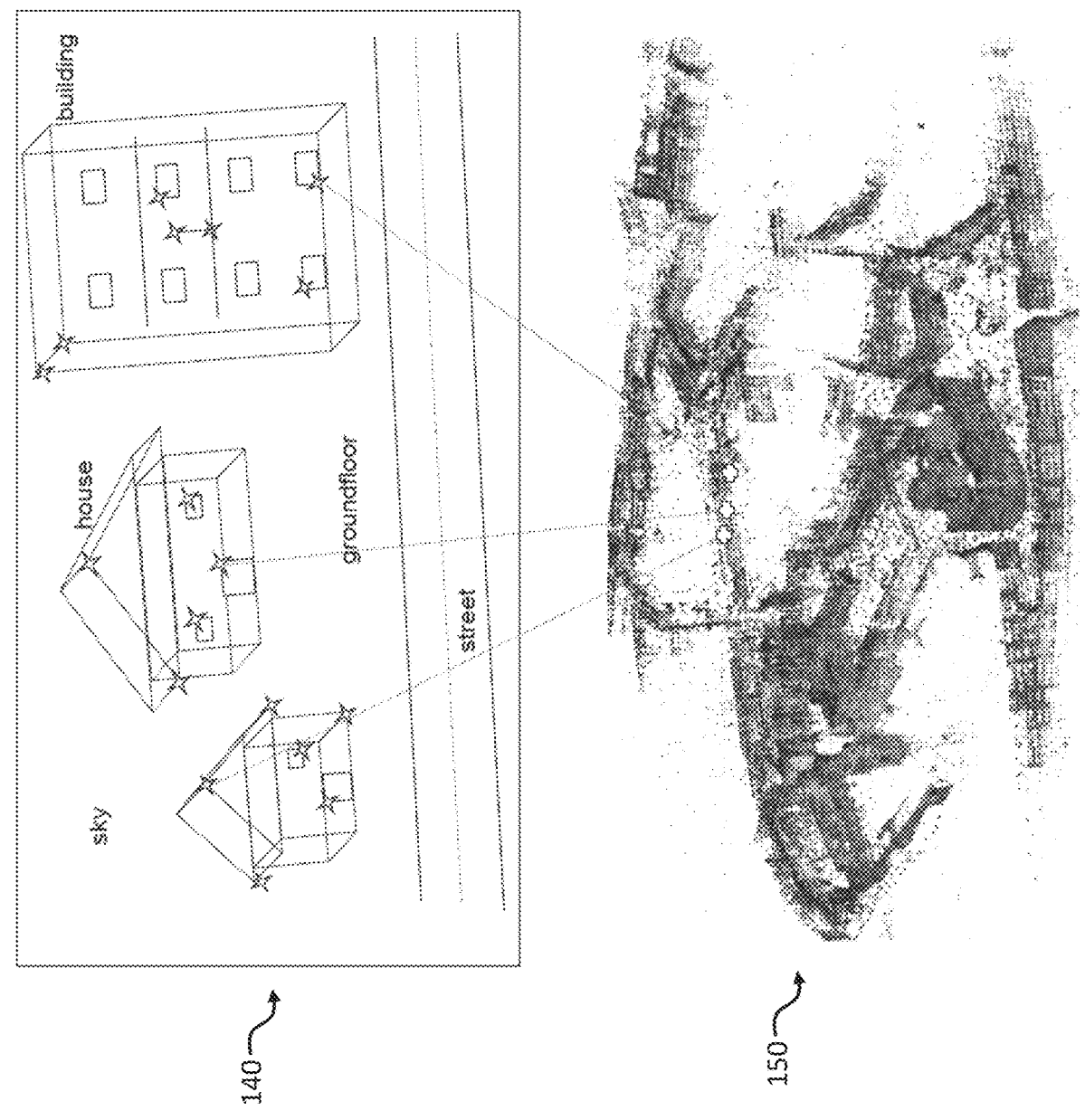
FIG. 5 shows a schematic diagram of an image and a 3D scene including a plurality of key points as processed by a data processing apparatus.

FIG. 5 shows a schematic diagram of the image 140 and the 3D scene 150 including a plurality of key 2D points 142 as processed by the data processing apparatus 100. FIG. 5 further shows in the upper region a sketch, e.g., the image 140 and in the lower region a representation of a 3D model, e.g., the 3D scene 150. The upper sketch depicts an example of an image 140 and denotes a scene 150 taken by a camera. The sketch depicts a real scenario where several buildings exist a long a street while the sky is shown in the background. The star symbols in the sketch, e.g., image 140 represent key 2D points 142 that are chosen from the image 140. These correspond to high scores. The lower plot represents a 3D scene 150 of the environment. Dotted lines between the sketch, e.g., image 140 and the 3D model, e.g., scene 150 inform about correspondences examples. The symbol crosses in the model represent 3D points 144 in the model that correspond to some of the key 2D points 142 in the image 140 that are directly estimated by the processing circuitry 110.

By interpreting the score as described above and below, areas which are non-discriminative such as sky, repetitive and non-distinguishable walls and ground floors, etc. are avoided. This can be illustrated in the sketch, e.g., image 140 drawn in the upper part of FIG. 5. By avoiding these regions, large numbers of outliers, e.g., wrong 2D-3D correspondences are filtered out.

By scoring the scene 150 based on repeatability and reliability, the processing circuitry 110 of the processing apparatus 100 can gain knowledge about the key 2D points 142 that are to be matched to other image without requiring a reference image. In other words, the obtained scores are used to perform feature matching without needing a reference image. Without comparing the descriptors 143 of the key 2D point 142 of interest to all descriptors 143 in the other frame, the processing circuitry 100 can perform an efficient matching step.

Since localizing may be performed in a previously visited environment, e.g., the 3D scene 150, e.g., re-localization, the processing circuitry 110 may learn, in particular by a model based on the neural network 113 and/or the further neural network 111, the 3D global coordinates, e.g., 3D points 144 of the key 2D points 144 that are highly discriminative and are likely to be seen and matched in other query frames. Given a query image, e.g., the image 140 the processing circuitry 110 may form 2D-3D correspondences between the query image 140 and the learned 3D map, e.g., scene 150 by exploiting those key 2D points 142 which are highly discriminative and whose 3D global points, e.g., 3D points 144 are potentially learned during training. This is illustrated in FIG. 6.

Figure 6:
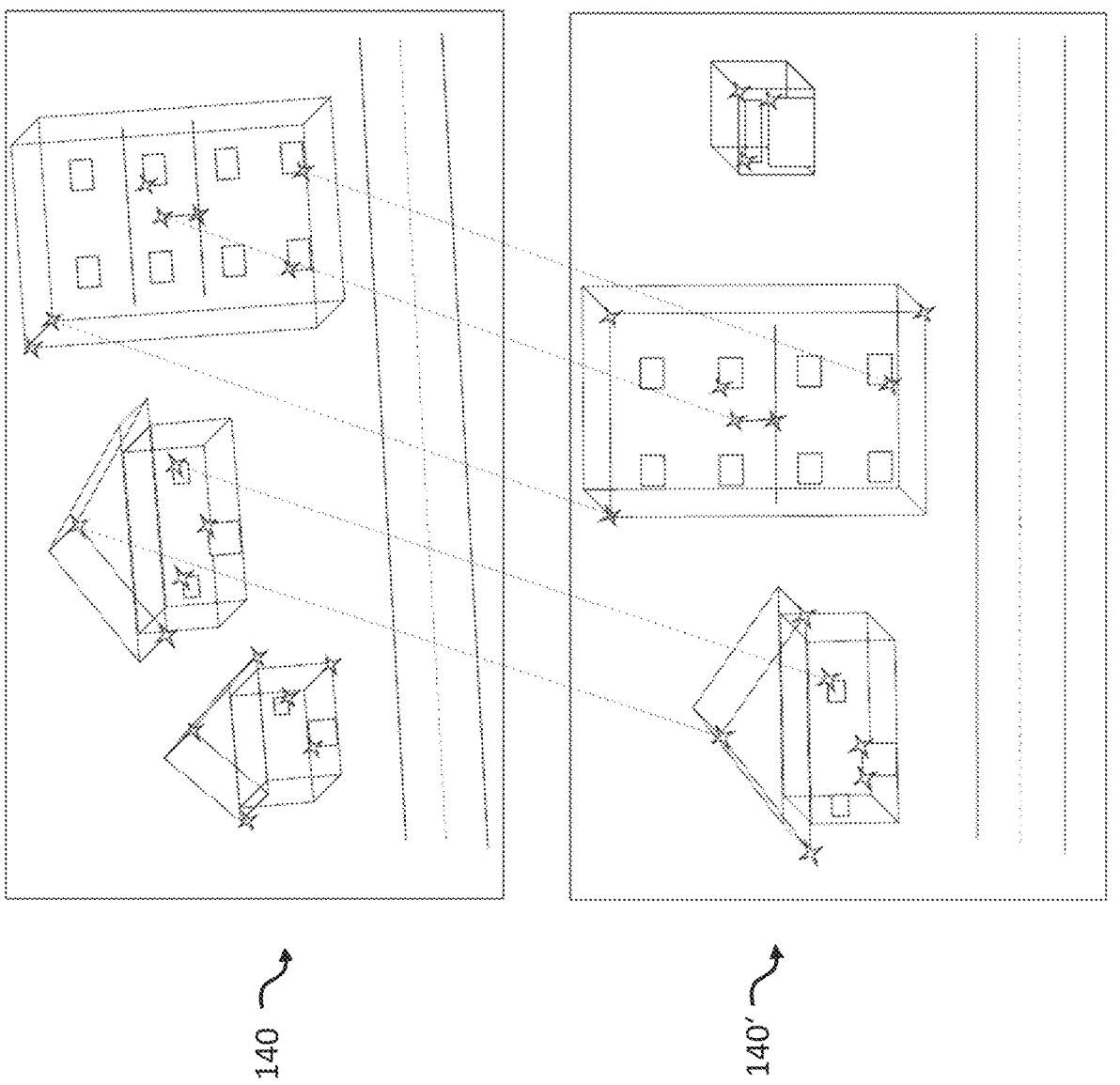
FIG. 6 shows a schematic diagram of two different images of a 3D scene including a plurality of key points as processed by an data processing apparatus.

FIG. 6 shows a schematic diagram of two different images 140, 140' of a 3D scene 150 including a plurality of 2D key points 142 as processed by the data processing apparatus 100. FIG. 6 also illustrates the benefit of interpreting the reliability and repeatability as a measure to infer about 2D key points 142 that are to be matched without performing an expensive, e.g., processing-intensive step of descriptors matching between the images 140, 140'. Given the two images 140, 140' which may share an overlap to a certain scene 150, 2D key points 142 that correspond to high scores may be selected from both images 140, 140'. Lines between star symbols in the two different images 140, 104' illustrate similar points in the two images 140, 140', e.g., matches. As will be appreciated, many of these selected points are the same in the two images 140, 140'. This may be done by simply exploiting repeatability and reliability scores 141*a-b* without descriptors matching. This leads to infer about matches from a single image, e.g., the image 140 which brings a big advantage for localization.

As will be appreciated, though no matching is done, only by choosing the key points 142 with the highest scores, it can be seen that many of the selected key points 142 are observed in perspectives depicting the same area. Given that the corresponding 3D points 144 of points observed in one frame are known, some 2D-3D correspondences to other frames may be obtained without having to perform a more complex matching procedure.

The results of the prior art approaches on scenes 150 of the datasets 7 scenes (indoor) and Cambridge Landmarks (Outdoor) are reported in Tables 1 and 2. The median localization errors are reported as two parts, one for translation and the other for orientation. In Table 1 the approach according to the present disclosure is compared with the prior art approach "ActiveSearch" and with the deep learning based pose regressors on some scenes of the widely used datasets in the field namely the indoor 7 scenes and the outdoor Cambridge landmarks. In the 'Method' column, DL stands for a deep learning approach while ST stands for structure-based methods.

TABLE 1

| Method | Proposal | 7scenes Chess | 7scenes Fire | 7scenes Heads | 7scenes Office |
|---|---|---|---|---|---|
| DL | PoseNet++ | 0.13 m, 4.48° | 0.27 m, 11.3° | 0.17 m, 13.0° | 0.19 m, 5.55° |
| DL | PoseLSTM | 0.24 m, 5.77° | 0.34 m, 11.9° | 0.21 m, 13.7° | 0.30 m, 8.08° |
| DL | MapNet | 0.08 m, 3.25° | 0.27 m, 11.69° | 0.18 m, 13.25° | 0.17 m, 5.15° |
| DL | AtLoc | 0.10 m, 4.07° | 0.25 m, 11.4° | 0.16 m, 11.8° | 0.17 m, 5.34° |
| ST | Active Search | 0.04 m, 2.0° | 0.03 m, 1.5° | 0.02 m, 1.5° | 0.09 m, 3.6° |
| | Current | 0.02 m, 0.8° | 0.03 m, 1.1° | 0.02 m, 1.3° | 0.05 m, 1.1° |

Table 1 shows median translation errors in meters and rotation errors in degree on scenes of the indoor 7 scenes dataset. As will be appreciated, the approach according to the present disclosure obtains the most accurate localization.

TABLE 2

| Proposal | Cambridge ShopFacade | Cambridge KingsCollege |
|---|---|---|
| PoseNet++ | 1.05 m, 4.0° | 0.99 m, 1.1° |
| PoseLSTM | 0.63 m, 5.73° | 1.06 m, 2.81° |
| Active Search | 0.12 m, 0.40° | 0.42 m, 0.6° |
| Current | 0.06 m, 0.5° | 0.21 m, 0.6° |

Table 2 shows median translation errors in meters and rotation errors in degree on scenes of the outdoor Cambridge landmarks. As shown in Table 1 and 2, the approach according to the present disclosure achieves the lowest localization errors on scenes from indoor and outdoor scenarios. The outdoor scene Cambridge Kings College is a challenging scene as it includes significant urban clutter such as pedestrians and vehicles with different weather conditions and significant motion blur.

TABLE 3

| Scene | Score 0.99 | Score 0.8 | Score 0.4 | Score 0.1 |
|---|---|---|---|---|
| Cambridge Kingscollege | 0.23 m, 0.7° | +0.09 m, +0.35° | +0.96 m, +2.46° | +1.48 m, +2.81° |

Table 3 illustrates the importance of the selected key points 142 based on their scores 141*a-b*. At inference, correspondences with high scores are selected and used to compute a pose 160. For this experiment, 200 correspondences at different scores were chosen. The localization error for the key points 142 is mentioned with the highest scores and the evolution of the errors is written for the key points 142 with lower scores relative to the reported localization error at the highest score. The number of RANSAC iterations is set to 100.

Table 3 further shows evolution of median localization errors for correspondences selected at different scores (repeatability and reliability) relative to the errors obtained from correspondences with a score of 0.99. As observed, choosing correspondences with high scores lead to the lowest localization errors. Selecting correspondences with lower scores degrade the localization accuracy. By prioritizing parts of the 3D scene 150 based on repeatability and reliability scores 141*a-b* and by selecting the top scored correspondences, accurate poses 160 are obtained in real runtime according to the approach adopted by embodiments of the present disclosure.

Figure 7:
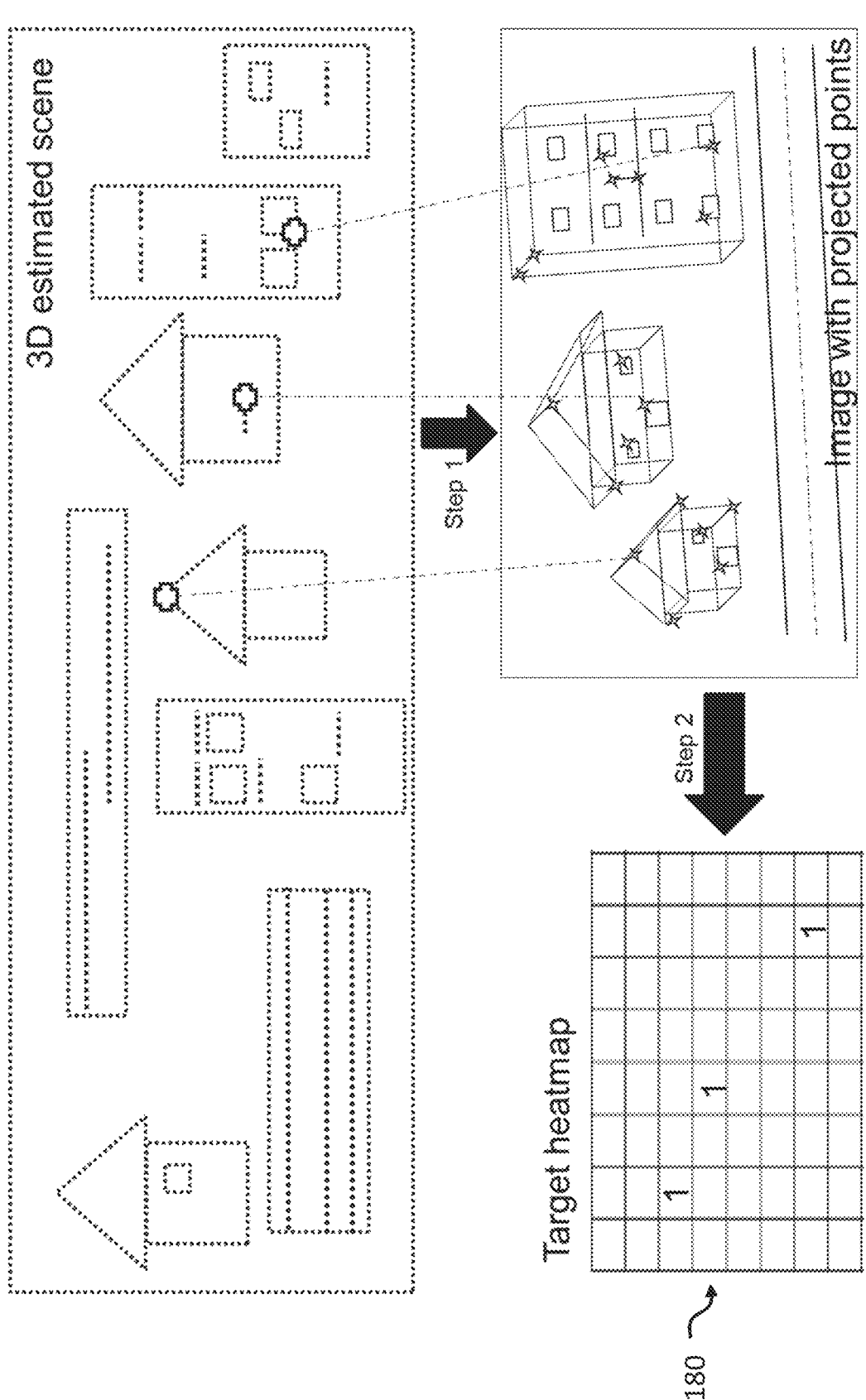
FIG. 7 shows a schematic diagram of an image, a 3D scene, and a heat map including a plurality of key points as processed by a data processing apparatus.

FIG. 7 shows a schematic diagram of the image 140, the 3D scene 150, and a heat map 180 including a plurality of 2D key points 142 as processed by a data processing apparatus. The processing circuitry 110 may be configured to create the heat map, e.g., target heat map 180 for training the 2D key points neural network, e.g., the further neural network 111. The processing circuitry 110 may be further configured to create target labels for training the 2D key point neural network, e.g., the further neural network 111 to obtain confidence values. The main goal of the 2D key point neural network, e.g., the further neural network 111 is to provide the means to select pixels, e.g., key points 142 of the image 140 that are useful for localization. These are the discriminative key points 142. To achieve this goal, the further neural network 111 may be trained to predict a heat map 180 for every input image 140. The further neural network 111, through training, is guided to imitate a target heat map 180 that corresponds to every single image 140. These target heat maps 180 emphasize pixels that are useful for localization and give them high confidence value.

For creating these heat maps 180, sparse 3D model may be exploited by the processing circuitry 110 that represent the 3D scene 150 to be localized in. The sparse 3D model compromises a set of 3D points 144 (relative to a global coordinate system).

For every training image, e.g., image that belongs to the training set, the 3D points of a sparse 3D model may be projected into the respective training image. The locations of projected key 2D points 142 in the target heat map 180 may be assigned top probability scores, which may be 1. Since the 3D model is a sparse model, only pixels that correspond to a 3D point in the 3D model are assigned the highest scores in the target heat map 180.

In the exemplary 3D model, the set of 3D points may be projected into the training image, e.g., the 2d oriented mesh of pixels. 3D points that are observed from the training image, e.g., marked with a cross symbol in FIG. 7, fall into specific pixels in the training image, e.g., marked with a star symbol in FIG. 7. The target heat map 180 may then be assigned probability values, where the highest probability values, e.g., value of 1, are assigned to the locations of projections. Through this process, target heat maps 180 are created and used to train the 2D key point neural network, e.g., further neural network 111.

FIG. 8 shows a flow diagram illustrating a data processing method 800 for determining the pose 160 based on the image 140 of the 3D scene 150.

The data processing method 800 comprises a step of selecting 801 a plurality of key 2D points 142 of a plurality of 2D points of the image 140 based on a respective score of the respective 2D point.

The data processing method 800 further comprises a step of determining 803 at least for a subset of the plurality of 2D points of the image 140 a respective feature vector for obtaining a plurality of feature vectors 143.

Moreover, the data processing method 800 comprises a step of concatenating 805 the image 140 with the plurality of feature vectors 143 for obtaining an intermediate tensor 145.

Moreover, the data processing method 800 comprises a step of determining 807 a plurality of 3D points 144 of the 3D scene 150 based on the intermediate tensor 145.

Moreover, the data processing method 800 comprises a step determining 809 the pose 160 based on the plurality of key 2D points 142 of the image 140 and the plurality of 3D points 144 of the 3D scene 150 using a Perspective-n-Point scheme.

The data processing method 800 can be performed by the data processing apparatus 100. Thus, further features of the data processing method 800 result directly from the functionality of the data processing apparatus 100 as well as its different embodiments described above and below.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

For the several embodiments disclosed herein, it should be understood that the disclosed system, apparatus, and method may be implemented in other manners. For example, the described embodiment of an apparatus is merely exemplary. For example, the unit division is merely a logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the solutions of the embodiments.

In addition, functional units of the embodiments disclosed herein may be integrated into one processing unit, or each of the units may exist alone physically, or two or more units are integrated into one unit.

What is claimed is:

1. A data processing apparatus for determining a pose based on an image of a three dimensional (3D) scene, wherein the data processing apparatus comprises:

a processor; and a memory storing instructions that when executed by the processor cause the data processing apparatus to perform steps including:

select a plurality of key two dimensional (2D) points of a plurality of 2D points of the image based on a respective score of each of the plurality of 2D points, wherein the score is one of a repeatability score and a reliability score;

determine at least for a subset of the plurality of 2D points of the image a respective feature vector for obtaining a plurality of feature vectors;

concatenate the image with the plurality of feature vectors for obtaining an intermediate tensor;

determine a plurality of 3D points of the 3D scene based on the intermediate tensor;

determine the pose based on the plurality of key 2D points of the image and the plurality of 3D points of the 3D scene using a Perspective-n-Point scheme;

implement a further neural network to determine a score for selecting the plurality of key 2D points of the plurality of 2D points of the image based on the respective score of each of the plurality of 2D points; and train the further neural network using a target heat map based on a training image, wherein a plurality of maximum values of the target heat map correspond to a plurality of locations of projections of a plurality of 3D points of a 3D model of the 3D scene.

2. The data processing apparatus of claim 1, wherein the processing circuitry is configured to determine the pose based on the plurality of key 2D points of the image and the plurality of 3D points of the 3D scene using the Perspective-n-Point scheme and a random sample consensus (RANSAC) scheme.

3. The data processing apparatus of claim 1, wherein the image comprises one or more image channels.

4. The data processing apparatus of claim 1, wherein the respective score determined by the processing circuitry for each of the plurality of 2D points is a confidence score.

5. The data processing apparatus of claim 1, wherein the processing circuitry is configured to implement a neural network configured to determine the plurality of 3D points of the 3D scene based on the intermediate tensor.

6. The data processing apparatus of claim 1, wherein the further neural network is further configured to determine at least for the subset of the plurality of 2D points of the image the respective feature vector.

7. The data processing apparatus of claim 1, wherein the processing circuitry is configured to implement a neural network configured to determine the plurality of 3D points of the 3D scene based on the intermediate tensor and to determine a score for selecting the plurality of key 2D points of the plurality of 2D points of the image based on the respective score of each of the plurality of 2D points.

8. The data processing apparatus of claim 7, wherein the processing circuitry is configured to train the neural network using a target heat map based on a training image, wherein a plurality of maximum values of the target heat map correspond to a plurality of locations of projections of a plurality of 3D points of a 3D model of the 3D scene.

9. The data processing apparatus of claim 1, wherein the processing circuitry is configured to concatenate the image with the plurality of feature vectors for obtaining the intermediate tensor by concatenating for each 2D point an intensity value of the 2D point with a feature vector of the 2D point.

10. A data processing method for determining a pose based on an image of a three dimensional (3D) scene, wherein the data processing method comprises:

selecting a plurality of key two dimensional (2D) points of a plurality of 2D points of the image based on a respective score of each of the plurality of 2D points, wherein the score is one of a repeatability score and a reliability score;

determining at least for a subset of the plurality of 2D points of the image a respective feature vector for obtaining a plurality of feature vectors;

concatenating the image with the plurality of feature vectors for obtaining an intermediate tensor;

determining a plurality of 3D points of the 3D scene based on the intermediate tensor; and determining the pose based on the plurality of key 2D points of the image and the plurality of 3D points of the 3D scene using a Perspective-n-Point scheme;

implementing a further neural network to determine a score for selecting the plurality of key 2D points of the plurality of 2D points of the image based on the respective score of each of the plurality of 2D points; and training the further neural network using a target heat map based on a training image, wherein a plurality of maximum values of the target heat map correspond to a plurality of locations of projections of a plurality of 3D points of a 3D model of the 3D scene.

11. The data processing method of claim 10, further comprising:

determining the pose based on the plurality of key 2D points of the image and the plurality of 3D points of the 3D scene using the Perspective-n-Point scheme and a random sample consensus (RANSAC) scheme.

12. The data processing method of claim 10, wherein the image comprises one or more image channels.

13. The data processing method of claim 10, wherein the respective score for each of the plurality of 2D points is a confidence score.

14. The data processing method of claim 10, further comprising:

implementing a neural network configured to determine the plurality of 3D points of the 3D scene based on the intermediate tensor.

15. The data processing method of claim 10, wherein the further neural network is further configured to determine at least for the subset of the plurality of 2D points of the image the respective feature vector.

16. A non-transitory computer-readable storage medium, wherein the computer-readable storage medium stores program instructions, and when the program instructions are run on a processor, the processor is caused to:

selecting a plurality of key two dimensional (2D) points of a plurality of 2D points of the image based on a respective score of each of the plurality of 2D points, wherein the score is one of a repeatability score and a reliability score;

determining at least for a subset of the plurality of 2D points of the image a respective feature vector for obtaining a plurality of feature vectors;

concatenating the image with the plurality of feature vectors for obtaining an intermediate tensor;

determining a plurality of 3D points of the 3D scene based on the intermediate tensor; and determining the pose based on the plurality of key 2D points of the image and the plurality of 3D points of the 3D scene using a Perspective-n-Point scheme;

implementing a further neural network to determine a score for selecting the plurality of key 2D points of the plurality of 2D points of the image based on the respective score of each of the plurality of 2D points; and training the further neural network using a target heat map based on a training image, wherein a plurality of maximum values of the target heat map correspond to a plurality of locations of projections of a plurality of 3D points of a 3D model of the 3D scene.

* * * * *